US011141816B2

(12) United States Patent
Neveu et al.

(10) Patent No.: US 11,141,816 B2
(45) Date of Patent: Oct. 12, 2021

(54) NOZZLE COVER

(71) Applicant: United Technologies Corporation, Farmington, CT (US)

(72) Inventors: Daniel R. Neveu, Ludlow, MA (US); Thomas R. Davis, Cheshire, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 591 days.

(21) Appl. No.: 15/982,597

(22) Filed: May 17, 2018

(65) Prior Publication Data

US 2019/0351508 A1    Nov. 21, 2019

(51) Int. Cl.
*B23K 26/14* (2014.01)
*B23K 26/354* (2014.01)

(52) U.S. Cl.
CPC ........ *B23K 26/1488* (2013.01); *B23K 26/354* (2015.10)

(58) Field of Classification Search
CPC .. B23K 26/389; B23K 26/1488; B23K 26/38; B23K 26/146; B23K 26/382; B23K 26/03; B23K 26/032; B23K 26/14; B23K 26/354; B23K 2201/001; B23K 26/24; B23K 26/323; B23K 26/244; B23K 26/28; B23K 31/125; B23K 26/21; B23K 26/20; B23K 26/082; B23K 26/22; B23K 15/0006; B23K 26/04; B23K 26/0604; B23K 26/0823; B23K 26/02; B23K 26/067; B23K 26/0861; B23K 26/0884; B23K 26/0816; B23K 26/042; B23K 26/048; B23K 26/046; B23K 26/40; B23K 26/08; B23K 26/0006;

(Continued)

(56) References Cited

U.S. PATENT DOCUMENTS 8,997,351 B2    4/2015 Hlavaty et al.
9,427,288 B1 *  8/2016 Chenger ................ A61B 90/05
(Continued)

FOREIGN PATENT DOCUMENTS

CN    105364324 A  *  3/2016
CN    105364324 A     3/2016

OTHER PUBLICATIONS

Extended European Search Report for EP Application No. 19174771.6, dated Dec. 2, 2019, pp. 7.
Communication pursuant to Article 94(3) EPC for EP Application No. 19174771.6, dated Mar. 29, 2021, 4 Pages.

*Primary Examiner* — Dana Ross
*Assistant Examiner* — Rachel R Rizzo
(74) *Attorney, Agent, or Firm* — Kinney & Lange, P.A.

(57) ABSTRACT

A nozzle cover for a laser drill includes a mount, a first shell member, and a second shell member. The mount has a first opening centered about a drill axis through which a nozzle can extend. The first shell member extends along the drill axis and has a first end attached to the mount at a first pivot and a second end with a first notch. The second shell member extends along the drill axis and has a first end attached to the mount at a second pivot and a second end with a second notch. The first shell member and the second shell member are configured to pivot between a closed position in which the first shell member and the second shell member form a hollow interior portion coaxial with the drill axis to enclose the nozzle and an open position in which the nozzle is exposed.

20 Claims, 4 Drawing Sheets

(58) Field of Classification Search
CPC .... B23K 9/02; B23K 26/322; B23K 26/0093; B23K 26/073; B23K 26/0626; B23K 26/26; B23K 26/044; B23K 26/32; B23K 26/0876; B23K 26/242; B23K 26/0608; B23K 26/062; B23K 26/211; B23K 31/003; B23K 26/16; B23K 26/60; B23K 26/064; B23K 26/0648; B23K 26/0622; B23K 26/703; H01R 4/029; H01R 43/0221; H01R 12/59; H05K 3/328; G01B 11/30; G01N 21/55; G01N 21/88; H01L 21/02595; H01L 21/02609; H01L 21/02686; H01L 21/02532; H01L 21/0268; H01L 21/2026; H01L 21/02691; H01L 27/1285; H01L 21/02683; H01L 21/1296; H01L 21/268; C30B 29/605; C30B 13/22; C30B 1/04; G02B 26/101; G03F 7/70041; G03F 7/70725; F01D 5/186; H01M 50/572; H01M 50/10; H01M 50/531; H01M 10/42; H01M 10/0404; B25J 11/005; F16B 5/04; F16B 5/08

See application file for complete search history.

(56) References Cited

U.S. PATENT DOCUMENTS

| | | | |
|---|---|---|---|
| 9,858,657 | B2 | 1/2018 | Guy |
| 2006/0153668 | A1* | 7/2006 | Weick ................ B23K 26/1488 414/776 |
| 2012/0085738 | A1* | 4/2012 | Trivette ............. B23K 26/1462 219/121.67 |
| 2013/0330144 | A1* | 12/2013 | Eickens et al. ......... B08B 15/04 |
| 2016/0239955 | A1 | 8/2016 | Guy |
| 2017/0252866 | A1 | 9/2017 | Hu |
| 2017/0304904 | A1* | 10/2017 | Kato .................... B23B 29/034 |
| 2018/0110503 | A1* | 4/2018 | Flock ................ A61B 17/3462 |

* cited by examiner

NOZZLE COVER

FIELD OF THE INVENTION

The present invention relates to a cover for a nozzle of a drill and, in particular, to a clamshell-like cover for a nozzle of a laser drill.

BACKGROUND

When using a laser to melt a material, such as a metallic material and/or alloy, to form holes and other openings, the material removed (called the slag) can splatter back onto the nozzle of the laser. The slag can then cool and solidify on the nozzle. Over time, the slag can build up on the nozzle and either needs to be removed from the nozzle (through chemical or mechanical means) or the nozzle needs to be replaced. Each of these solutions requires time and expense as the laser ceases operation during the repair.

SUMMARY

A nozzle cover for a laser drill includes a mount, a first shell member, and a second shell member. The mount has a first opening centered about a drill axis through which a nozzle can extend. The first shell member extends along the drill axis and has a first end attached to the mount at a first pivot and a second end with a first notch. The second shell member extends along the drill axis and has a first end attached to the mount at a second pivot and a second end with a second notch. The first shell member and the second shell member are configured to pivot between a closed position in which the first shell member and the second shell member form a hollow interior portion coaxial with the drill axis to at least partially enclose the nozzle and an open position in which the second end of the first shell member is distant from the second end of the second shell member to expose the nozzle.

A laser drill includes a nozzle and a casing. The nozzle has a neck at a top end and a tip at a bottom end from which a laser is configured to extend. The casing includes a mount attached to the neck of the nozzle and having a first pivot and a second pivot, a first half shell having a first end attached to the mount at the first pivot and a second end with a first half slot, and a second half shell having a first end attached to the mount at the second pivot and a second end with a second half slot. The first half shell is configured to pivot about the first pivot and the second half shell is configured to pivot about the second pivot between a closed position in which the casing surrounds at least a portion of the nozzle and an open position in which the second end of the first half shell and the second end of the second half shell are distant from one another.

DETAILED DESCRIPTION

A nozzle cover for a laser drill includes a mount for attaching the nozzle cover to a nozzle of the laser drill and shell members that form a clamshell-like casing around the nozzle to protect the nozzle from slag that otherwise would splatter the nozzle during operation of the laser drill. The shell members rotate about pivot points on the mount between a closed position in which the shell members surround/enclose the nozzle to protect the nozzle and an open position in which the two shell members are rotated away from one another to expose the nozzle and allow access to the nozzle for maintenance. The nozzle can be configured to have two shell members (as shown in the disclosed embodiment) or more than two shell members that pivot between the open position and the closed position. Further, the shell members can include mating features that are configured to mate with one another to securely hold the shell members adjacent one another in the closed position while also being disengageable to allow for the shell members to pivot into the open position.

Figure 1A:
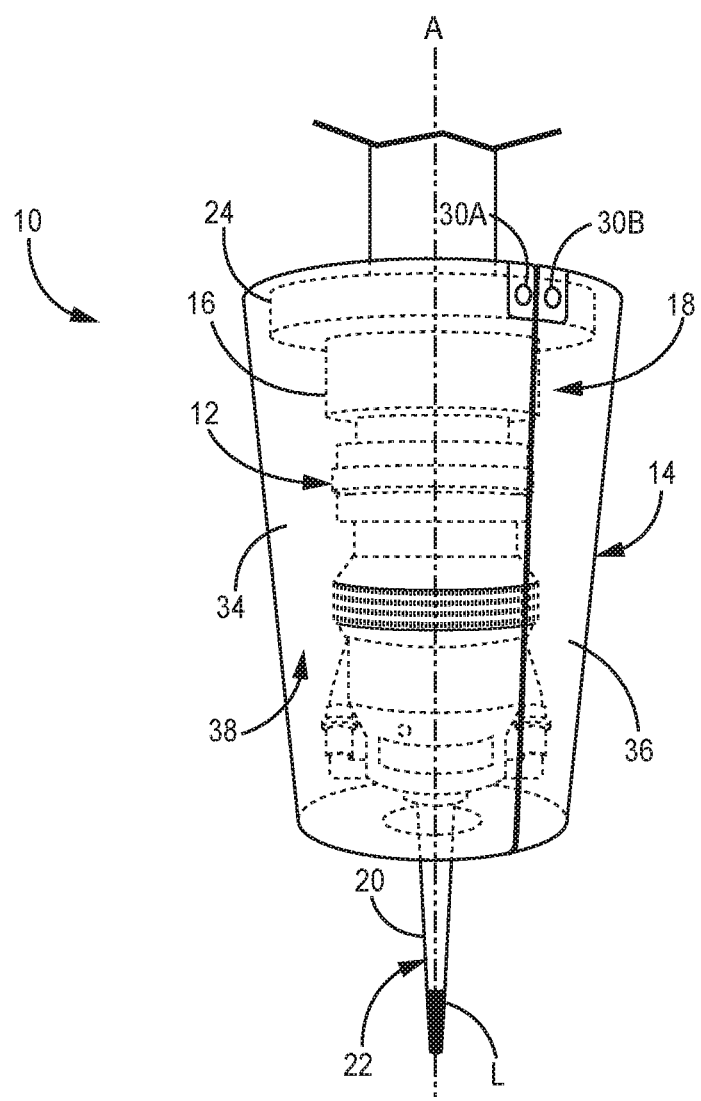
FIG. 1A is a perspective view of a laser drill with a nozzle protected by a cover.
Figure 1B:
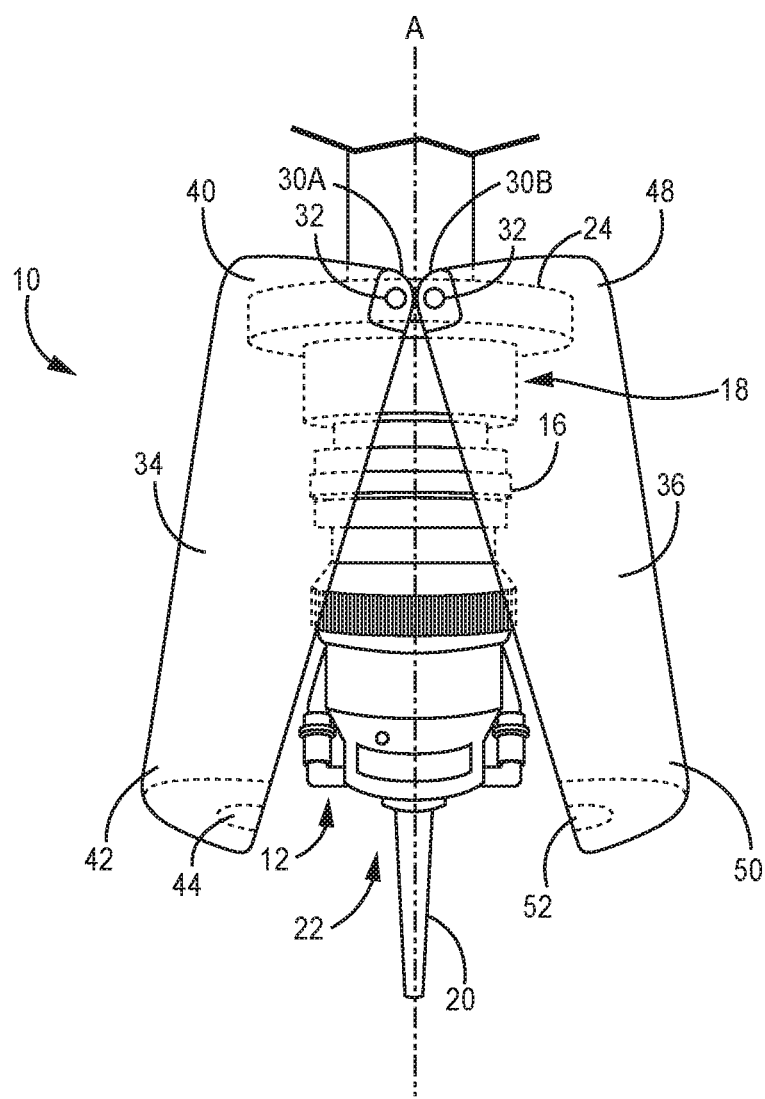
FIG. 1B is a perspective view of the laser drill with the cover opened.
Figure 1C:
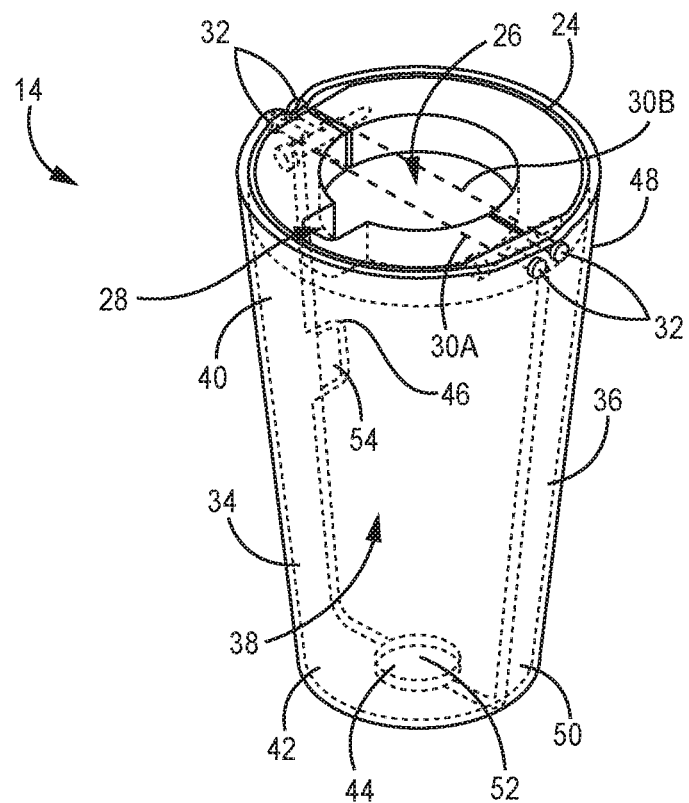
FIG. 1C is a perspective view of the cover in isolation.
Figure 1D:
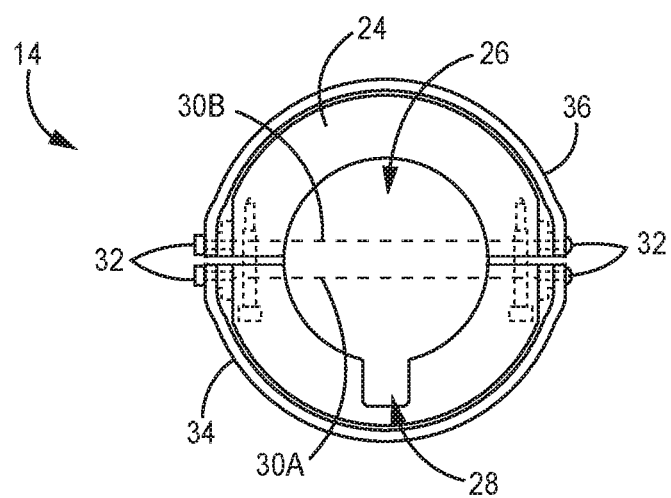
FIG. 1D is a top view of the cover.
Figure 1E:
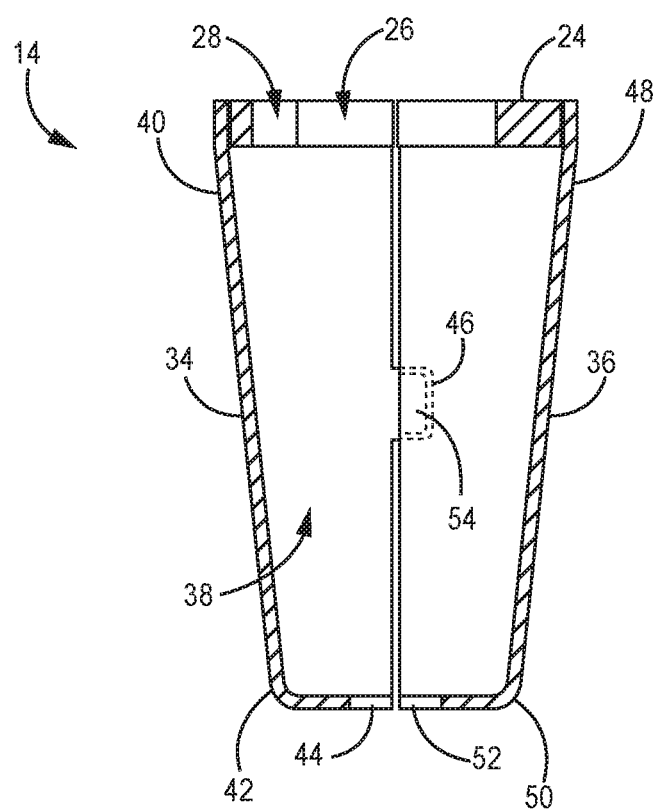
FIG. 1E is a side cross-sectional view of the cover.

FIG. 1A is a perspective view of a laser drill with a nozzle protected by a nozzle cover, FIG. 1B is a perspective view of the laser drill with the nozzle cover opened, FIG. 1C is a perspective view of the nozzle cover in isolation, FIG. 1D is a top view of the nozzle cover, and FIG. 1E is a side cross-sectional view of the nozzle cover.

Laser drill 10 includes nozzle 12 and nozzle cover 14. Nozzle 12 extends along drill axis A and includes neck 16 at top end 18 and tip 20 at bottom end 22. Nozzle cover 14 (also called a casing) includes mount 24 with first opening 26, second opening 28, first pivot 30A, second pivot 30B, and pins 32. Nozzle cover 14 further includes first shell member 34, second shell member 36, and hollow interior portion 38. First shell member 34 includes first end 40, second end 42, first notch 44, and first mating feature 46, and second shell member 36 includes first end 48, second end 50, second notch 52, and second mating feature 54. Laser drill 10 produces laser L that extends downward from tip 20 of nozzle 12.

Laser drill 10 is configured to be used in a variety of applications, including drilling holes in metallic materials and/or alloys. Laser drill 10 includes nozzle 12, which extends along drill axis A and is at an end of laser drill 10 from which laser L extends. Nozzle 12 is attached to other components of laser drill 10 by neck 16 at top end 18. Laser L, which is used for drilling, extends downward through tip 20, which is an elongated component at bottom end 22 of nozzle 12. Neck 16 and tip 20 can be one continuous and monolithic component, or neck 16 and tip 20 can be multiple pieces fastened together. Neck 16 is shown as a substantially cylindrical-shaped portion with a variety of stair-step features, while tip 20 is shown as a frusticonical-shaped elongated portion extending away from neck 16 downward along drill axis A. Other embodiments of laser drill 10 can include a nozzle with other configurations suitable to produce and/or focus laser L for drilling. Nozzle 12 can have any size and shape because nozzle cover 14 can be sized, shaped, and oriented to accommodate any size and shape of nozzle 12. When in operation, the material removed (i.e., slag) during the drilling by laser L extending out from tip 20 of nozzle 12 can splatter onto laser drill 10 and, in particular, onto nozzle 12. Thus, nozzle cover 14 is utilized to protect nozzle 12 from the slag to ensure nozzle 12 is not damaged and remains operational.

Nozzle cover 14 is a protective casing that, when in the closed position, surrounds the entirety of neck 16 and at least a portion of tip 20. Mount 24 of nozzle cover 14 attaches nozzle cover 14 to nozzle 12 and/or other components of laser drill 10, while first shell member 34 and second shell member 36 are configured to extend away from mount 24 to surround nozzle 12. Nozzle cover 14 can be constructed from any material(s) suitable for protecting nozzle 12 from slag, such as a polymer material to which the slag has difficulty binding to and attaching. Additionally, nozzle cover 14 can be constructed from a material that is opaque, translucent, or transparent (as shown) depending on the material used and the need to see nozzle 12 during operation of laser drill 10. While shown with first shell member 34 and second shell member 36 forming a hollow cylindrical shape (e.g., a hollow frusticonical shape), nozzle cover 14 can have other configurations suitable for enclosing nozzle 12 when nozzle cover 14 is in the closed position.

As shown in FIGS. 1C-1E, mount 24 includes first opening 26 (centered about drill axis A) and is annular in shape to encircle neck 16 at top end 18 of neck 16. Mount 24 can be any size, shape, and/or configuration suitable to attach nozzle cover 14 to laser drill 10 while providing a support structure to which first shell member 34 and second shell member 36 can attach and pivot. Mount 24 can be attached to nozzle 12 and/or another component of laser drill 10 by any type of fastener or by another mechanical means. While shown as a circular aperture in the disclosed embodiment, first opening 26 can have any shape necessary to accommodate and attach to nozzle 12. Further, mount 24 can be separable into at least two pieces to allow for installation onto laser drill 10 without the need for nozzle cover 14 to slide onto laser drill 10. Mount 24 includes second opening 28 adjacent first opening 26 through which cables and/or other components of laser drill 10 can extend to communicate with nozzle 12 (or for another purpose). While shown as a substantially square aperture in the disclosed embodiment, second opening 28 can have any shape necessary to accommodate the cables and/or other components of laser drill 10.

Mount 24 also includes first pivot 30A and second pivot 30B, which extend through mount 24 perpendicular to drill axis A. First pivot 30A can include attachment points where first shell member 34 attaches to mount 24 and pivots between the open position and the closed position. Similarly, second pivot 30B can include attachment points where second shell member 36 attaches to mount 24 and pivots between the open position and the closed position. First pivot 30A and second pivot 30B can be in close proximity to one another or distant from one another depending on the configuration of first shell member 34, second shell member 36, and mount 24. Extending into mount 24 along first pivot 30A can be pins 32, which are configured to secure first shell member 34 to mount 24 while allowing first shell member 34 to pivot. Further, similar pins 32 can extend into mount 24 along second pivot 30B to secure second shell member 36 to mount 24 while allowing second shell member 36 to pivot. Pins 32 can be any sized, shaped, and/or oriented fasteners suitable to secure shell members 34 and 36 to mount 24. As shown, the disclosed embodiment includes four pins: two for each of first shell member 34 and second shell member 36.

First shell member 34 and second shell member 36 (also called first half shell and second half shell, respectively) form the protective covering that encloses nozzle 12 when nozzle cover 14 is in the closed position. First shell member 34 and second shell member 36 can be identical to one another except for first mating feature 46 and second mating feature 54, which may have different configurations. First shell member 34 and second shell member 36 collectively form a hollow frusticonical shell (as shown in the disclosed embodiment), a hollow cylindrical shell, or another casing configuration that includes hollow interior portion 38 within which nozzle 12 is located when first shell member 34 and second shell member 36 are in the closed position. In the closed position, first shell member 34 and second shell member 36 are centered about drill axis A, while in the open position, first shell member 34 and second shell member 36 are pivoted outward about first pivot 30A and second pivot 30B, respectively, such that second end 42 of first shell member 34 is distant from second end 50 of second shell member 36.

As shown in FIGS. 1C and 1D, first end 40 of first shell member 34 is attached to mount 24 at first pivot 30A, while first end 48 of second shell member 36 is attached to mount 24 at second pivot 30B. Distant from mount 24 is second end 42 of first shell member 34 and second end 50 of second shell member 36. As shown in FIG. 1B, when in the open position, second end 42 of first shell member 34 is distant from second end 50 of second shell member 36 because both first shell member 34 and second shell member 36 have pivoted away from each other to allow access to nozzle 12 within hollow interior portion 38.

First shell member 34 includes first notch 44 at second end 42, while second shell member 36 includes second notch 52 at second end 50. First notch 44 and second notch 52 are each cut-outs that collectively form an aperture in second end 42 (of first shell member 34) and second end 50 (of second shell member 36) through which tip 20 of nozzle 12 can extend. Each of first notch 44 and second notch 52 can be a semicircular shape (to collectively form a circular aperture when nozzle cover 14 is in the closed position) or another shape to provide the aperture through which tip 20 and/or laser L can extend. When in the closed position, tip 20 of nozzle 12 can extend out of the aperture created by first notch 44 of first shell member 34 and second notch 52 of second shell member 36. Alternately, nozzle 12 and/or nozzle cover 14 can be configured such that the entirety of nozzle 12 is enclosed within hollow interior portion 38 when nozzle cover 14 is in the closed position and only laser L extends out during operation.

First shell member 34 can include first mating feature 46, while second shell member 36 can include second mating feature 54. First mating feature 46 and second mating feature 54 are configured to mate with one another to securely hold second end 42 of first shell member 34 adjacent second end 50 of second shell member 36 so that nozzle cover 14 remains in the closed position while also allowing for disengagement so that first shell member 34 and second shell member 36 can pivot into the open position. As shown in FIGS. 1C and 1E, first mating feature 46 can be a tab with second mating feature 54 being a slot. The tab can be configured to be radially outward from the slot and extend into the slot to press fit and hold the tab adjacent the slot. While shown as a tab and slot arrangement, first mating feature 46 and second mating feature 54 can have other configurations suitable to allow for engagement (to securely hold nozzle cover 14 in the closed position) and disengagement (to allow for nozzle cover 14 to pivot into the open position). Additionally, first shell member 34 and second shell member 36 can include multiple mating features, or other embodiments do not need to include mating features.

While shown as only having two shell members 34 and 36, nozzle cover 14 can includes more than two shell members 34 and 36 that pivot about mount 24 at additional and/or differently configured pivots between the open and closed position.

Nozzle cover 14 for laser drill 10 includes mount 24 for attaching nozzle cover 14 to nozzle 12 (and/or other components of laser drill 10). Nozzle cover 14 also includes shell members 34 and 36 that form a clamshell-like casing around nozzle 12 to protect nozzle 12 from slag that would otherwise splatter nozzle 12 during operation of laser drill 10. Shell members 34 and 36 pivot/rotate about pivots 30A and 30B, respectively, on mount 24 between the closed position in which shell members 34 and 36 surround/enclose nozzle 12 to protect nozzle 12 and the open position in which shell members 34 and 36 are rotated away from one another to expose nozzle 12 and allow access to nozzle 12 for maintenance. Nozzle 12 can be configured to have two shell members 34 and 36 (as shown) or more than two shell members that pivot between the open position and the closed position. Further, shell members 34 and 36 can include mating features 46 and 54 that are configured to mate with one another to securely hold shell members 34 and 36 adjacent one another in the closed position while also being disengageable to allow for shell members 34 and 36 to pivot into the open position.

Discussion of Possible Embodiments

The following are non-exclusive descriptions of possible embodiments of the present invention.

A nozzle cover for a laser drill includes a mount, a first shell member, and a second shell member. The mount has a first opening centered about a drill axis through which a nozzle can extend. The first shell member extends along the drill axis and has a first end attached to the mount at a first pivot and a second end with a first notch. The second shell member extends along the drill axis and has a first end attached to the mount at a second pivot and a second end with a second notch. The first shell member and the second shell member are configured to pivot between a closed position in which the first shell member and the second shell member form a hollow interior portion coaxial with the drill axis to at least partially enclose the nozzle and an open position in which the second end of the first shell member is distant from the second end of the second shell member to expose the nozzle.

The nozzle cover of the preceding paragraph can optionally include, additionally and/or alternatively, any one or more of the following features, configurations, and/or additional components:

The first notch is semicircular and the second notch is semicircular and adjacent to the first notch when the nozzle cover is in the closed position.

The first shell member and the second shell member each form half of a hollow cylindrical shell.

The first shell member and the second shell member each form half of a hollow frusticonical shell.

The mount is separable into at least two pieces.

The mount includes a second opening configured to allow cables to extend through the mount adjacent to the nozzle.

The mount is annular in shape.

The first shell member includes a first mating feature and the second shell member includes a second mating feature configured to mate with the first mating feature to securely hold the second shell member adjacent the first shell member.

The first mating feature is a slot and the second mating feature is a tab configured to extend into the slot.

The first shell member and the second shell member are constructed from a polymer material.

A laser drill assembly includes the nozzle extending along the drill axis and having a neck at a top to which the mount attaches and a tip at a bottom from which a laser is configured to extend and the nozzle cover disclosed above.

The tip is elongated and extends along the drill axis through the first notch and the second notch when the nozzle cover is in the closed position.

A laser drill includes a nozzle and a casing. The nozzle has a neck at a top end and a tip at a bottom end from which a laser is configured to extend. The casing includes a mount attached to the neck of the nozzle and having a first pivot and a second pivot, a first half shell having a first end attached to the mount at the first pivot and a second end with a first half slot, and a second half shell having a first end attached to the mount at the second pivot and a second end with a second half slot. The first half shell is configured to pivot about the first pivot and the second half shell is configured to pivot about the second pivot between a closed position in which the casing surrounds at least a portion of the nozzle and an open position in which the second end of the first half shell and the second end of the second half shell are distant from one another.

The laser drill of the preceding paragraph can optionally include, additionally and/or alternatively, any one or more of the following features, configurations, and/or additional components:

The tip of the nozzle extends through the first half slot and second half slot when the casing is in the closed position.

The first half shell and the second half shell collectively form a hollow frusticonical shape.

The mount is annular in shape and encircles the top end of the nozzle.

The mount is separable into at least two pieces.

The mount includes a passage configured to allow cables of the laser drill to extend through the mount to attach to the neck of the nozzle.

The first half shell includes a first mating feature and the second half shell includes a second mating feature configured to mate with the first mating feature to securely hold the first half shell adjacent to the second half shell.

A first pin and a second pin that each extend through the first half shell and into the mount along the first pivot and a third pin and a fourth pin that each extend through the second half shell and into the mount along the second pivot.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nozzle cover for a laser drill, the nozzle cover comprising:
   a mount with a first opening centered about a drill axis through which a nozzle can extend;
   a first shell member extending along the drill axis, the first shell member having a first end attached to the mount at a first pivot and a second end with a first notch; and
   a second shell member extending along the drill axis, the second shell member having a first end attached to the mount at a second pivot and a second end with a second notch,
   wherein the first shell member and the second shell member each have a first end attached to the mount, a second end remote from the mount, and a first side, the respective first sides abutting one another between their respective first and second ends when in a closed position, wherein the first and second pivots are located so that the first and second shells each pivot at their respective first ends proximal their respective first sides.

2. The nozzle cover of claim 1, wherein the first notch is semicircular and the second notch is semicircular and adjacent to the first notch when the nozzle cover is in the closed position.

3. The nozzle cover of claim 1, wherein the first shell member and the second shell member each form half of a hollow cylindrical shell.

4. The nozzle cover of claim 1, wherein the first shell member and the second shell member each form half of a hollow frusticonical shell.

5. The nozzle cover of claim 1, wherein the mount is separable into at least two pieces.

6. The nozzle cover of claim 1, wherein the mount includes a second opening configured to allow cables to extend through the mount adjacent to the nozzle.

7. The nozzle cover of claim 1, wherein the mount is annular in shape.

8. The nozzle cover of claim 1, wherein the first shell member includes a first mating feature and the second shell member includes a second mating feature configured to mate with the first mating feature to securely hold the second shell member adjacent the first shell member.

9. The nozzle cover of claim 8, wherein the first mating feature is a slot and the second mating feature is a tab configured to extend into the slot.

10. The nozzle cover of claim 8, wherein the first shell member and the second shell member are constructed from a polymer material.

11. A laser drill assembly comprising:
the nozzle extending along the drill axis and having a neck at a top to which the mount attaches and a tip at a bottom from which a laser is configured to extend; and
the nozzle cover of claim 1.

12. The laser drill assembly of claim 11, wherein the tip is elongated and extends along the drill axis through the first notch and the second notch when the nozzle cover is in the closed position.

13. A laser drill comprising:
a nozzle having a neck at a top end and a tip at a bottom end from which a laser is configured to extend along a drill axis; and
a casing comprising:
a mount attached to the neck of the nozzle and having a first pivot and a second pivot;
a first half shell having a first end attached to the mount at the first pivot and a second end with a first half slot; and
a second half shell having a first end attached to the mount at the second pivot and a second end with a second half slot,
wherein the first half shell and the second half shell each have a first side, the respective first sides abutting one another between their respective first and second ends when in a closed position,
wherein the first and second pivots are located so that the first and second half shells each pivot at their respective first ends proximal their respective first sides.

14. The laser drill of claim 13, wherein the tip of the nozzle extends through the first half slot and second half slot when the casing is in the closed position.

15. The laser drill of claim 13, wherein the first half shell and the second half shell collectively form a hollow frusticonical shape.

16. The laser drill of claim 13, wherein the mount is annular in shape and encircles the top end of the nozzle.

17. The laser drill of claim 16, wherein the mount is separable into at least two pieces.

18. The laser drill of claim 13, wherein the mount includes a passage configured to allow cables of the laser drill to extend through the mount to attach to the neck of the nozzle.

19. The laser drill of claim 13, wherein the first half shell includes a first mating feature and the second half shell includes a second mating feature configured to mate with the first mating feature to securely hold the first half shell adjacent to the second half shell.

20. The laser drill of claim 11, further comprising:
a first pin and a second pin that each extend through the first half shell and into the mount along the first pivot; and
a third pin and a fourth pin that each extend through the second half shell and into the mount along the second pivot.

* * * * *